United States Patent [19]

Poné, Jr. et al.

[11] 4,149,799
[45] Apr. 17, 1979

[54] PHOTOGRAPHIC PRINTER WITH AUTOMATIC SLOPE COMPENSATION

[75] Inventors: John Poné, Jr., Minneapolis, Minn.; Peter N. Seidel, Erkelenz, Fed. Rep. of Germany

[73] Assignee: Pako Corporation, Minneapolis, Minn.

[21] Appl. No.: 848,737

[22] Filed: Nov. 4, 1977

[51] Int. Cl.² .............................................. G03B 27/78
[52] U.S. Cl. ....................................... 355/38; 355/77; 355/88
[58] Field of Search ..................... 355/35, 38, 77, 88, 355/68, 83; 356/175, 202, 203

[56] References Cited

U.S. PATENT DOCUMENTS

| | | | |
|---|---|---|---|
| 3,482,916 | 12/1969 | Mey et al. | 355/38 |
| 3,672,768 | 6/1972 | Schaub et al. | 355/38 |
| 3,873,199 | 3/1975 | Weinert | 355/38 |

Primary Examiner—L. T. Hix
Assistant Examiner—W. J. Brady
Attorney, Agent, or Firm—Kinney, Lange, Westman and Fairbairn

[57] ABSTRACT

The photographic printer of the present invention automatically derives and stores slope compensation factors which are used in subsequent printing to compensate for exposure. Reference or slope center values are stored for a reference negative and prints of various negatives are made. A print which requires correction is selected from the test prints which have been made, and the desired density corrections for that print are supplied to the printer. The density values of the negative from which the print was made are measured, and slope compensation factors are derived from the slope center values, the desired density corrections, and the measured density values. Exposures in subsequent printings are compensated based upon these derived slope compensation factors.

6 Claims, 6 Drawing Figures

PHOTOGRAPHIC PRINTER WITH AUTOMATIC SLOPE COMPENSATION

REFERENCE TO CO-PENDING APPLICATIONS

Reference is made to co-pending applications by F. Laciak and J. Poné entitled "Exposure Time Control"; by J. Poné entitled "Photographic Printer with Automatic Density and Color Corrections for Paper Gamma"; and by J. Poné entitled "Photographic Printer with Interactive Color Balancing"; which were filed on even date and are assigned to the same assignee as the present application. These co-pending applications describe photographic printing systems which may use the gamma compensation of the present invention.

BACKGROUND OF THE INVENTION

The present invention relates to photographic printing systems. In particular, the present invention is an improved photographic printer which automatically derives slope compensation factors for use in printing.

Photographic printers produce color or black and white prints or transparencies from photographic film originals (generally negatives). High intensity light is passed through the film and imaged on the photosensitive print medium (film or paper). The photographic emulsion layers on the print paper or film are exposed and subsequently processed to produce a print of the scene contained in the original.

A critical portion of a photographic printer is the exposure control, which controls the exposure of the photosensitive medium in order to ensure that the image on the photosensitive medium is properly exposed. The exposure control may utilize inputs from several different sources in order to determine the proper exposure. For example, most automatic printers use large area transmission density (LATD) sensors to sample light transmitted by the negative either prior to or during the exposure. Control of the exposure is determined using a method known as "integration to grey". In addition, many automatic printers include an automatic density correction (ADC) or color scanning station which scans the negative prior to printing and corrects the exposure in the event of a condition known as "subject failure". Finally, the operator may enter density correction signals from the operator control panel. Based upon some or all of these input signals, the exposure control determines the proper exposure for each of the color channels or for one black and white channel.

Photographic printers often include a "slope" adjustment which modifies exposures. These "slope" corrections have been used to correct for a number of deviations from normal printing conditions.

Originally, slope corrections were used to compensate for paper reciprocity. Although exposure of a photographic medium (which equals the product of light intensity and exposure time) may be maintained constant, the resulting density varies as a function of exposure time because of paper reciprocity. For example, if the exposure time is doubled and the intensity of the light is halved, the exposure is the same but the density is typically not the same due to paper reciprocity.

Later, slope was used to compensate for other factors. For example, it was found that certain negatives or certain scenes were not properly printed if the "integration to grey" method was strictly followed. For example, if the negative is dense in comparison to a normal negative, it may be desirable for the print to be of a different density than would be achieved by integration to grey. Similarly, a negative which is less dense than normal may also print best if the resulting print is of a different density than neutral grey. Slope has been used to compensate for these deviations from normal printing.

Still another factor which slope has been used to compensate for is non-linearity in the negative material. Slope, which is sometimes called over- or under-correction, has also been used to compensate for other factors which would otherwise lead to incorrect or non-optimal printing.

Due to the complexity of the slope correction and the multiple uses to which the correction can be put, determination of the proper slope correction is often difficult. In the prior art, the photographic printers have required the user of the printer to determine the desired slope values by trial and error and supply them to the printer as numerical values or as control settings. Determination of the proper slope values, therefore, can be a difficult and time-consuming task for the user.

SUMMARY OF THE INVENTION

The photographic printer of the present invention automatically determines slope compensation factors. The user prints a test print from a negative which is known to deviate from the normal or average negative. After reviewing the test print, the user enters desired density corrections for that print. The density values of the negative are measured, and the printer derives slope compensation factors from slope center values for a normal or average negative, the desired density corrections which the user has entered, and the measured density values of the negative. The slope compensation factors are then used to compensate exposures in subsequent printing.

DETAILED DESCRIPTION OF THE PREFERRED EMBODIMENTS

The photographic printer of the present invention is unique in that slope compensation factors are automatically derived by the printer from desired color density correction changes entered by the operator for a test negative which deviates from the average or normal negatives. The printer automatically and internally translates these desired corrections into the slope compensation factors which are required to produce those corrections. Subsequent printing uses these derived slope compensation factors.

Figure 1:
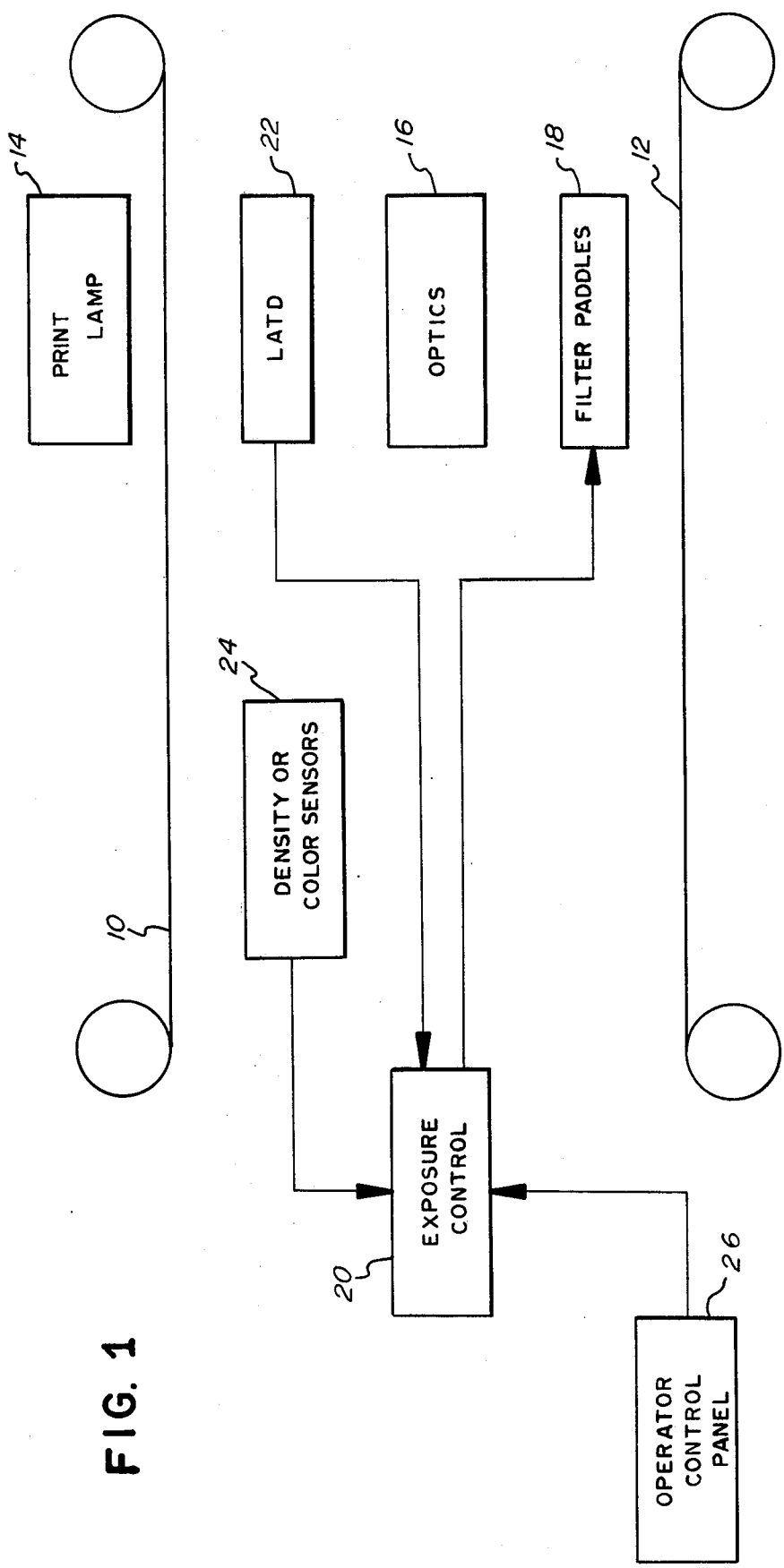
FIG. 1 is a block diagram illustrating a photographic printer.

FIG. 1 illustrates a photographic printer system which may use the automatic slope compensation system of the present invention. In this printer, an image contained in film 10 is printed onto photosensitive paper 12. Light from print lamp 14 is passed through a frame of film 10 and is focused by optics 16 onto an appropriate portion of photosensitive paper 12.

The exposure time during which paper 12 is exposed to the image from film 10 is determined by the position of filter paddles and shutter 18. The filter paddles typically include a subtractive filter for each color channel (red, green, and blue). Filter paddles and shutter 18 are controlled by exposure control 20. Alternatively, other systems in which exposure control 20 controls exposure by controlling print light intensity rather than exposure time can be used with the present invention.

In the embodiment shown in FIG. 1, exposure control 20 receives input signals from large area transmission density (LATD) sensors 22, from density or color sensors 24, and from operator control panel 26. Not all of these sources of input signals are required in every system, and, similarly, other sources of input signals which affect the exposure may be used in the printer. For example, when sensors 24 are color sensors, LATD sensors 22 may not be required, and the signals from sensors 24 may be used in place of the LATD signals.

In the present invention, exposure control 20 compensates exposure by slope compensation factors. These slope compensation factors are derived from (1) slope center times entered by the operator through operator control panel 26, (2) the negative densities measured by LATD sensors 22 for a test negative which deviates from the slope center, and (3) color density and overall density button corrections entered by the user through operator control panel 26 for the test negative. The derived slope compensation factors are used to modify exposure during subsequent printing by the printer.

Figure 2:
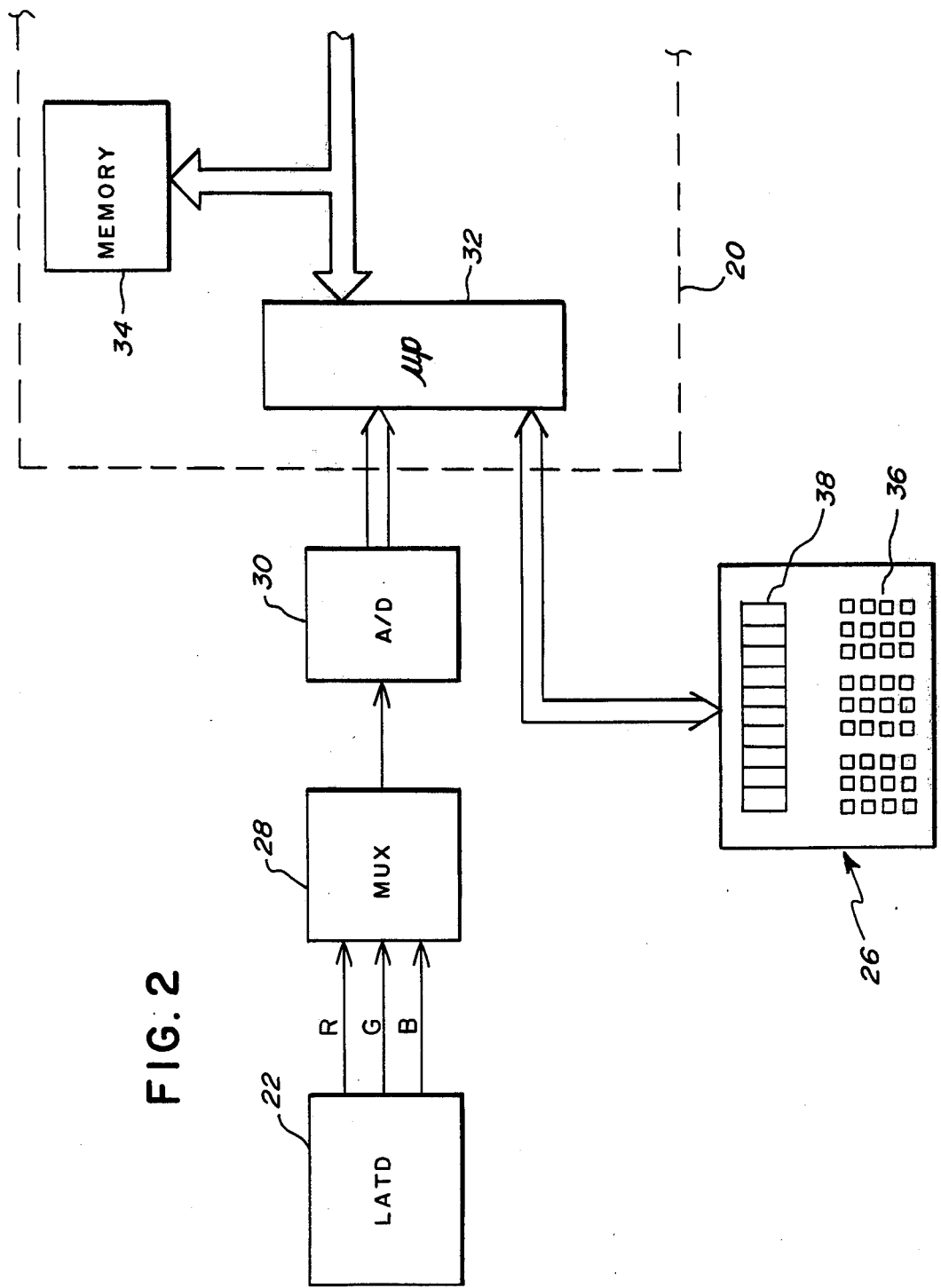
FIG. 2 is a block diagram illustrating in further detail a portion of the printer of FIG. 1.

FIG. 2 shows a more detailed view of a preferred embodiment of a portion of the printer shown in FIG. 1. In FIG. 2, the red, green, and blue signals from LATD sensors 22 are multiplexed by multiplexer 28 and supplied to A/D converter 30. Digital LATD signals are supplied by A/D converter 30 to a digital processor such as microprocessor 32 of exposure control 20. Also shown in FIG. 2 is memory 34, which is associated with microprocessor 32 and preferably includes both read only memory (ROM) and random access memory (RAM) storage. Other portions of the exposure control 20 are not shown in FIG. 2 because they are not critical to the present invention. In one preferred embodiment, exposure control 20 is of the type described in a co-pending patent application entitled "Exposure Time Control" by F. Laciak and J. Poné, Jr., filed on even date and assigned to the same assignee as the present application.

FIG. 2 also shows a control panel 26 which includes a keyboard having operator-controlled keys or buttons 36 and a display 38. The operator may enter various control and correction signals into exposure control 20 by means of the various buttons 36. Display 38 displays the information which is being used by exposure control 20, or instructions which the operator is to follow.

Figure 3:
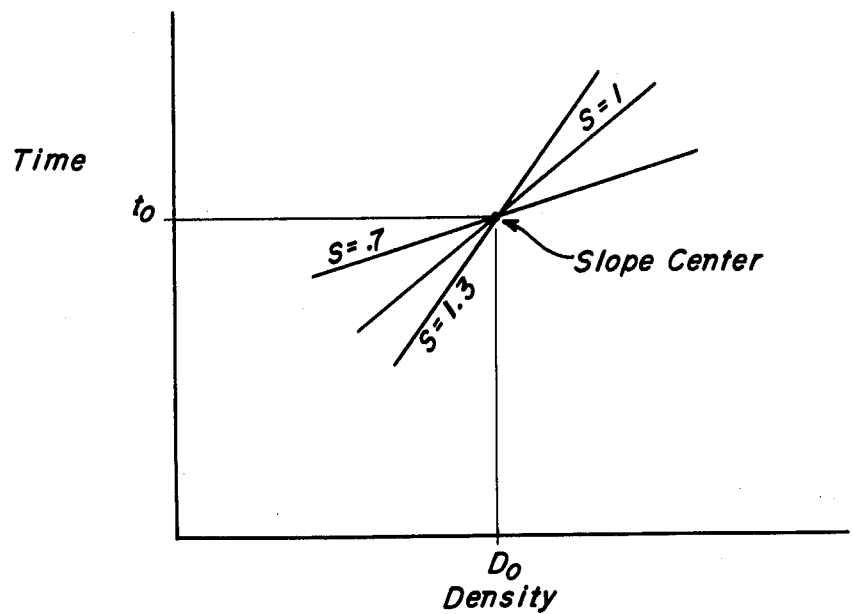
FIG. 3 is a graph of exposure time as a function of negative density which illustrates slope values.

FIG. 3 is a graph of exposure time as a function of negative density which illustrates three of many possible slope relationships. The line designated S=1 is a line having a slope of 1. Using this line would yield integration to grey if paper reciprocity did not exist. As discussed previously, however, it is often advantageous to provide slope compensation (i.e. cause the printer to obey a time/density relationship having a slope other than 1). For example, FIG. 3 also shows a slope line designated S=1.3. This slope is similar to one that a user would normally use in a printer, since the user typically wants lighter or denser negatives to print lighter (i.e. at a less exposure) or denser (at a greater exposure) than a normal negative.

On occasion, a user of a photographic printer will desire "inverted" slope. The slope line labeled S=0.7 in FIG. 3 is an example of inverted slope.

It can be seen from FIG. 3 that all of the slope lines intersect at a point labeled "slope center". This slope center is a reference point which corresponds to a normal or average reference negative which will be printed at the same density for the same time regardless of the slope. The slope compensation only affects negatives which deviate from the slope center.

FIG. 3 illustrates examples of "rocker slope", in which the slope lines are straight lines which pass through the slope center. It is also possible, however, to segment the slope line into a over-slope and an under-slope, which need not be of the same value. Segmented slope provides more flexible and often more accurate slope compensation than rocker slope.

A significant advantage of the present invention is that it is equally applicable to rocker slope or segmented slope, as well as to other slope systems in which the slope is non-linear. This permits the present invention to be far more flexible and adaptable to new slope systems than are the prior art slope determining techniques.

Figure 4:
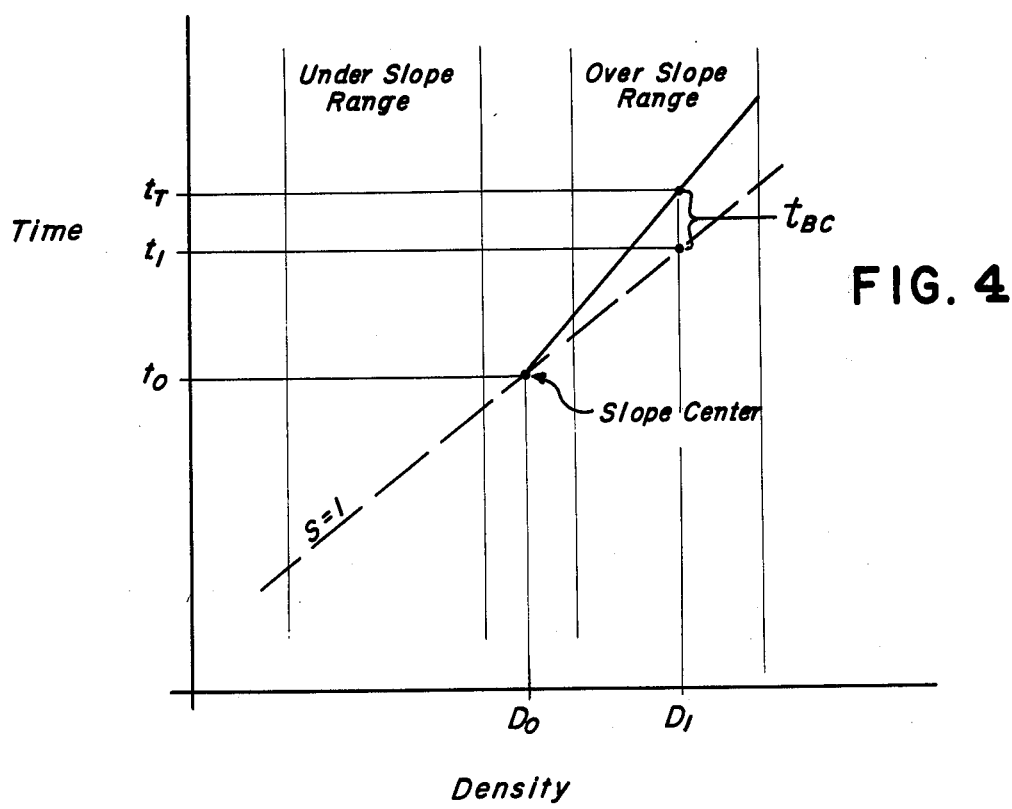
FIG. 4 is a graph of exposure time as a function of negative density which illustrates the method of the present invention for automatically determining slope from desired color density corrections.
Figure 5:
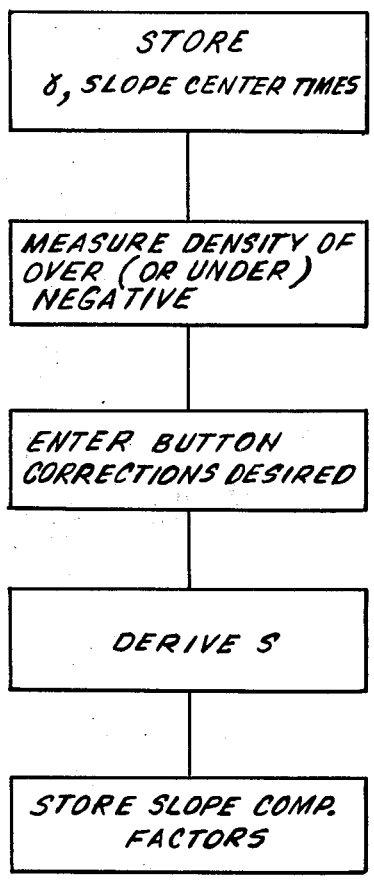
FIG. 5 is an operational block diagram illustrating the determination of slope compensation factors in one preferred embodiment of the present invention.

FIGS. 4 and 5 illustrate the automatic method by which the printer of the present invention derives slope values from desired density corrections entered by the user through correction buttons 36 of operator control panel 26. FIG. 4 is a graph of exposure time as a function of negative density, and FIG. 5 is an operational block diagram which describes the steps performed in obtaining slope compensation factors.

In a preferred embodiment of the present invention, the user of the printer causes slope compensation factors for each color channel to be determined through an interactive session during which the user enters certain critical parameters.

First, "GAMMA FACTORS=(##) (##) (##)" is displayed by display 38. This operation requires the user to enter three numbers which represent photographic paper gammas for the red, green, and blue emulsion layers of the photographic paper being used. The use of gamma and the measurement of photographic paper gamma are discussed in further detail in a co-pending application by J. Poné, Jr. entitled "Photographic Printer with Automatic Density and Color Corrections for Paper Gamma" which was filed on even data and is assigned to the same assignee as the present application. After the gamma values have been entered by the operator, they are displayed on display 38 so that the operator can check the entries to verify that they are correct. Upon correct entry, the printer proceeds to the next critical parameter.

Second, "SLOPE CENTER=(##) (##) (##)" is displayed. This operation requires the user to enter three numbers which correspond to the exposure times of a normal negative. The slope center times correspond to the average printing times for the whole population of negatives, and should be as close as possible to "dead heat" (i.e. equal printing times for all three channels). After these three values have been displayed and verified, they are entered, and the printer proceeds to the next step.

Third, the printer goes into the slope determining operation. In a preferred embodiment of the present invention, the slope lines are divided into "over-slope" and "under-slope". The over-slope portion covers negatives having a density greater than the slope center density, and the under-slope covers those negatives having density less than the slope center density. It should be recognized, however, that the present invention is equally applicable to rocker slope-type systems and to non-linear slope systems.

Display 38 first displays "OVER SLOPE=(##) (##) (##)". In a preferred embodiment of the present invention, the red, green, and blue over-slope values can be determined by two different methods. The first method is "normal slope entry" in which the operator enters the three numbers through keyboard keys 36. The second method is "slope by correction entry", which is the automatic method of the present invention in which slope is determined by density corrections entered by the user.

When slope by correction entry operation is selected, display 38 displays "CORRECTION XX XX XX", which allows monitoring of the button corrections to be entered through keyboard 36.

The operator has previously made a test print of a negative which is known to deviate from the slope center on the "over" density side. This negative should not be a color failure negative, but rather should have reasonably consistent red, green, and blue densities. The test print is made under the initial slope conditions, which normally will be a slope=1 for each of the red, green, and blue color channels. The operator will review the print made from the test negative and will determine the necessary color density corrections which should be entered by buttons 36.

The test negative is inserted in the negative carrier and placed in the printing gate prior to the slope by correction entry operation. In a preferred embodiment of the present invention, the densities of the red, green, and blue colors are measured by LATD sensors 22. If the test negative is not a reasonable "over" negative, (i.e. it is too close to the slope center values, or extremely over so that it is close to fogged film) an error condition is displayed by display 38. FIG. 4 illustrates the density range within which an over negative must fall in order for "slope by correction entry" to proceed. If the density of the over negative falls outside of this range, the slope values derived would be inaccurate.

If the negative is a proper over negative, exposure control 20 derives the desired over-slope for each color channel based upon (1) slope center exposure time for that color, (2) the measured negative density for that color, and (3) the desired print density correction which has been entered by the user. In particular, exposure control 20 determines the exposure time $t_1$ for the particular color channel from the LATD signal (density $D_1$), based upon a slope of 1. It then determines the additional time increment $t_{BC}$ which corresponds to the buttoning correction which has been entered by the operator and determines the total exposure time $t_T = t_1 + t_{BC}$ for that color channel. Exposure control 20 then determines the slope of a line between the slope center and the point defined by total exposure time $t_T$ and density $D_1$. This slope is stored in the form of a slope compensation factor for the over-slope portion of the time-density relationship.

In the present invention, individual slope compensation factors are determined for the red, green, and blue color channels. It is possible, therefore, that each of these three color channels will have slightly different over-slope and slightly different under-slope. For convenience, FIGS. 3 and 4 have only illustrated a single color channel, but it will be recognized that similar operations are performed by exposure control 20 for each of the color channels.

In one preferred embodiment of the present invention, the calculations performed by exposure control 20 use the formula $t = t_0 10^{S(D-D_0)}$, where t is the actual exposure time; $t_0$ is the exposure time at slope center (i.e. exposure time for reference negative); S is the slope; $D_0$ is the reference negative density; and D is the measured negative density. While this formula has been found to be effective, other mathematical relationships between exposure time, negative density and slope may also be used to model the relationship of slope to exposure time and negative density. The present invention merely requires a predetermined model of the relationship of these parameters so that slope can be derived from desired print density corrections.

After the over-slope compensation factors have been derived and stored, the printer proceeds to the under-slope determining operation. This operation is identical to the over-slope operation in that either "normal slope entry" or "slope by correction entry" is possible. When "slope by correction entry" is performed, the test negative is an under negative whose density falls within a predetermined range similar to the range provided for over negatives.

Figure 6:
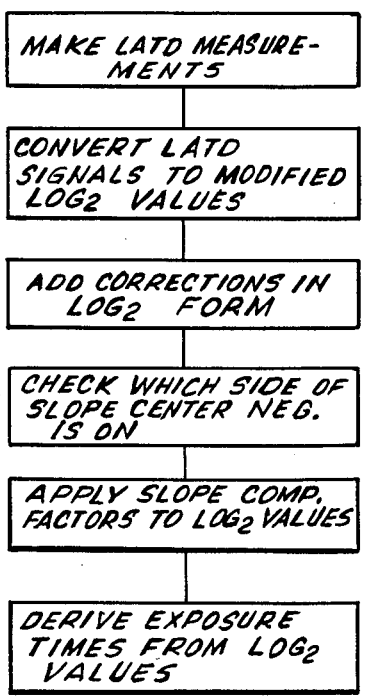
FIG. 6 is an operational block diagram illustrating the use of slope compensation factors during normal printing.

FIG. 6 illustrates normal operation of a photographic printer which utilizes the derived over- and under-slope compensation factors. In normal operation, LATD sensors 22 produce LATD signals which are multiplexed, converted to digital values, and supplied to microprocessor 32. These LATD signals are converted to modified $\log_2$ values by multiplying the $\log_2$ of the reciprocal of the LATD signal by a constant, which is a scaling factor. Exposure control 20 then adds corrections to the values in modified $\log_2$ form. These corrections include corrections based upon signals from automatic density or color sensors 24 or button corrections from operator control panel 26.

Before applying a slope compensation factor to the modified $\log_2$ values, exposure control 20 determines which side of slope center the measured negative densities fall. This determines whether over-slope or under-slope compensation will be applied. The slope compensation is provided by multiplying the appropriate slope compensation factor by the modified $\log_2$ value. The slope compensation factor is a combined factor which depends on both slope and gamma, so that the effect of the slope compensation is a constant regardless of variations in paper gamma. The slope compensation factors involve multiplication because the slope value is an exponent in the linear domain and, therefore, requires multiplication when the manipulations are performed in the $\log_2$ domain.

The $\log_2$ values for the three color channels are then used to derive exposure times for those three color channels. In the system described in the previously mentioned patent application by Laciak and Poné, the $\log_2$ values (after corrections and slope compensation have been made) are converted to a time base and a time count signal. The exposure time for the corresponding color channel is derived from the time base and the time count for that color channel.

In conclusion, the present invention is a simple yet highly accurate and highly effective method of determining slope without requiring the user to determine the slope values by trial and error. Instead, slope is determined automatically based upon the print density corrections which the user feels are necessary to improve a test print made from a test negative which deviates from the average or slope center density and time values.

Although the present invention has been described with reference to preferred embodiments, workers skilled in the art will recognize that changes may be made in form and detail without departing from the spirit and scope of the invention.

For example, although the present invention has been described in the context of a specific exposure control such as the control described in the previously mentioned co-pending patent application by Laciak and Poné, it is clear that other exposure controls may utilize the automatic slope correction of the present invention. In addition, although the present invention preferrably utilizes gamma compensation of the type described in the previously mentioned co-pending patent application of Poné, the present invention may also be performed without gamma compensation, although accuracy will suffer somewhat if gamma values deviate from average.

What is claimed is:

1. In a method of making photographic prints, the improvement comprising:
   storing slope center values which include a slope center exposure time for each color channel;
   entering desired density corrections for a print to be printed from a film original;
   measuring density values of the film original which deviate from reference densities corresponding to the slope center times;
   deriving slope compensation factors from the slope center values, the desired density corrections, and the measured density values;
   preventing the deriving of slope compensation factors if measured density values of the film original do not deviate from the reference densities within a predetermined range; and compensating exposures in subsequent printing based upon the slope compensation factors.

2. The method of claim 1 wherein deriving slope compensation factors comprises:
   determining exposure times for the measured density values based upon a predetermined slope value;
   determining exposure time increments required to provide the desired density corrections;
   adding the exposure times for the measured density values and the exposure time increments to yield total exposure times; and
   determining, for each color channel, the slope of a line from a point defined by the slope center values for that color channel and a point defined by the measured density value and total exposure time for that color channel.

3. The method of claim 2 wherein the deriving slope compensation factors further comprises:
   deriving slope compensation factors for each color channel from the determined slopes; and
   storing the slope compensation factors for use in subsequent printing.

4. A method of determining a slope compensation factor to be used in modifying exposures in a photographic printer, the method comprising:
   storing a slope center exposure time;
   printing a test print from a test film having a density which deviates from a reference density;
   entering a desired print density correction based upon the results of the test print;
   measuring density of the test film;
   determining an exposure time for the measured density based upon a predetermined slope value;
   determining an exposure time increment required to provide the desired density correction;
   adding the exposure time for the measured density and the exposure time increment to yield a total exposure time; and
   determining a slope compensation factor from the measured density of the test film, the total exposure time, and the slope center exposure time.

5. A photographic printer comprising:
   means for storing a slope center exposure time;
   means for measuring density of films;
   means for determining an exposure time from the measured density of a test film based upon a predetermined slope value;
   means for entering a desired density correction to be applied when printing a test film having a measured density which deviates from a reference density;
   means for deriving an exposure time increment required to provide the desired density correction;
   means for deriving a total exposure time from the exposure time for the measured density and the exposure time increment;
   means for deriving a slope compensation factor from the measured density of the test film, the total exposure time, and the slope center exposure time;
   means for storing the slope compensation factor;
   means for exposing a photosensitive medium to light from a film; and
   means for controlling exposure times as a function of measured density of the film and the slope compensation factor.

6. In a method of making photographic prints, the improvement comprising:
   storing slope center values which include a slope center exposure time for each color channel;
   entering desired density corrections for a print to be printed from a film original;
   measuring density values of the film original;
   determining exposure times based upon the measured density values and a predetermined slope value;
   determining exposure time increments required to provide the desired density corrections;
   adding the exposure times for the measured density values and the exposure time increments to yield total exposure times;
   deriving slope compensation factors based upon the slope center values, the total exposure times, and the measured density values; and
   compensating exposures in subsequent printing based upon the slope compensation factors.

* * * * *